Nov. 1, 1966  H. I. JOHNSON  3,281,963
TRAINING VEHICLE FOR CONTROLLING ATTITUDE
Filed Dec. 8, 1964  2 Sheets-Sheet 2
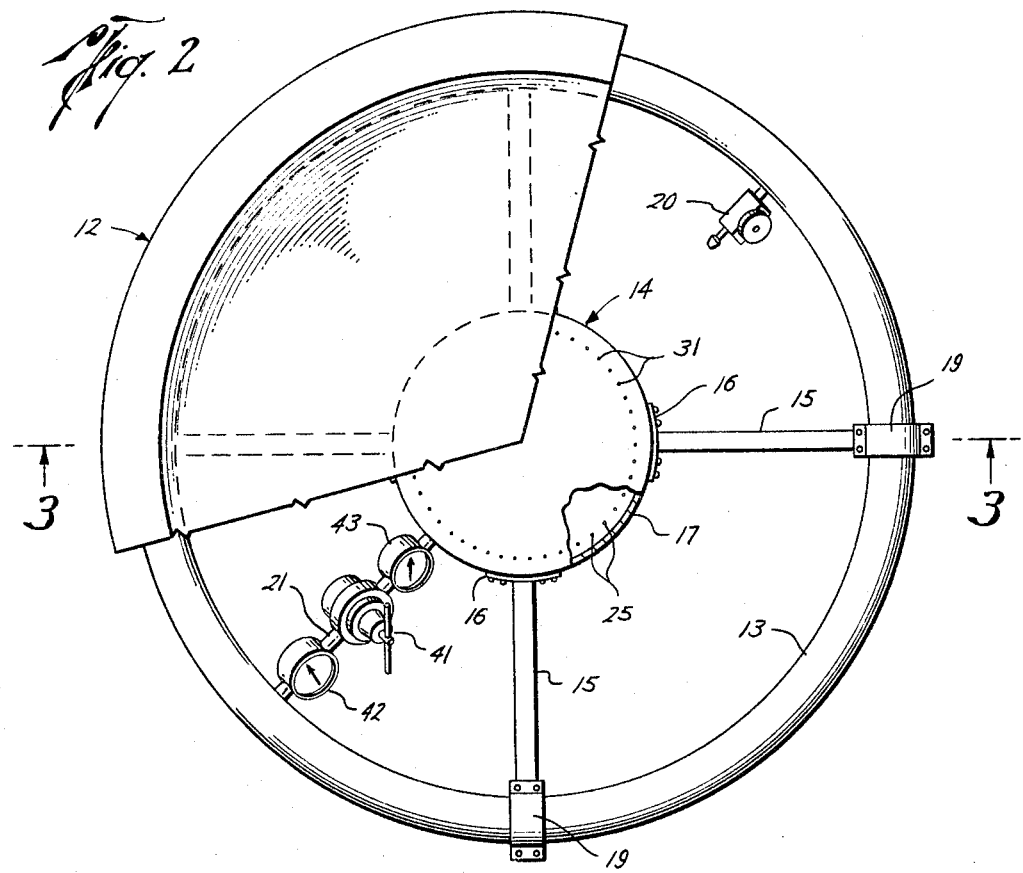
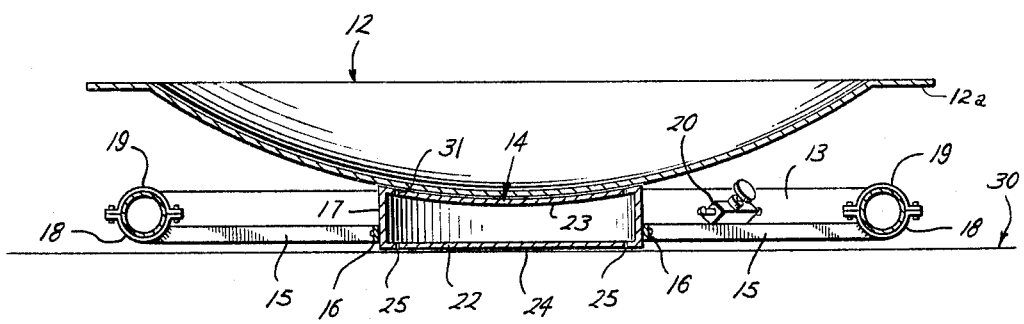
Harold I. Johnson
INVENTOR.
BY
ATTORNEYS his assignors to the United States Patent Office 3,281,963
Patented Nov. 1, 1966

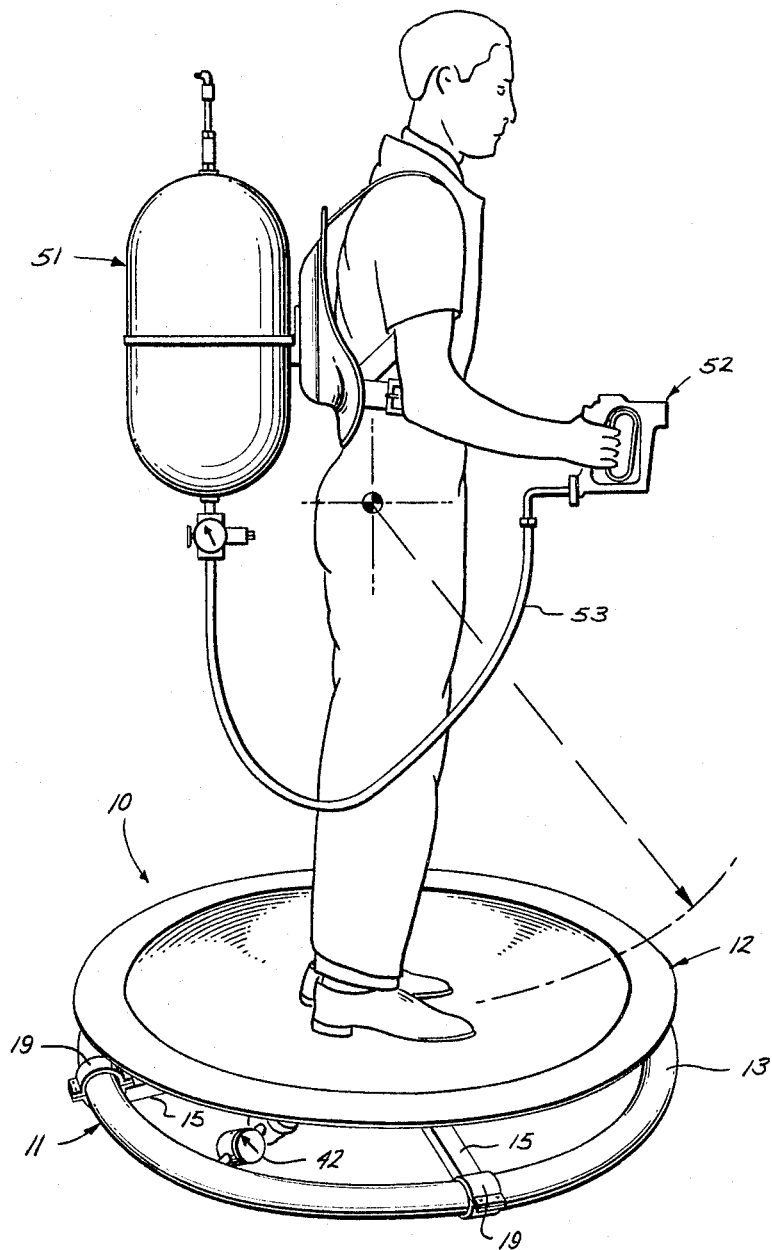

3,281,963
TRAINING VEHICLE FOR CONTROLLING ATTITUDE
Harold I. Johnson, Seabrook, Tex., assignor to the United States of America as represented by the Administrator of the National Aeronautics and Space Administration
Filed Dec. 8, 1964, Ser. No. 416,938
10 Claims. (Cl. 35—12)

The invention described herein may be manufactured and used by or for the government of the United States of America for governmental purposes without the payment of any royalty thereon or therefor.

This invention relates generally to training devices for controlling attitude, and more particularly to a vehicle which will permit friction-free movement with five degrees of freedom. It is anticipated that in the near future astronauts will be required to move about in the gravity-free environment of space outside the confines of a space vehicle. The trainee needs to learn through practice that any force he uses to move about must be exerted through the center of gravity of his body. A purpose of this invention is to provide a device which may be used by an astronaut to exercise the particular skills required to maneuver and maintain attitude control in free space when using either his own muscle power or when operating propulsion type devices.

The prior art methods and devices which have heretofore been devised for accomplishing this purpose have generally consisted in strapping the subject as rigidly as possible into a three-gimbal support system which may then be floated above the floor on several air pads. The air for providing the air bearing surfaces beneath the pads is usually supplied through an umbilical hose. The primary disadvantage of these devices is that their use requires a fixed position of the center of gravity of the human body relative to the supporting structure in order to achieve continuous neutral positional stability of the subject's body relative to the gravitational field existing on the earth's surface. In practice this goal has been found impossible to achieve because of the flexible nature of the human body, the blood pooling phenomena of the body, and the inability of a human being to hold all his body members in fixed relationship to each other for long periods of time.

Another disadvantage of the prior devices is that their gimbal support structures, which are required to be rigid, are necessarily heavy and therefore tie a large amount of unwanted inertia to the human body. In addition, the umbilical hose connection through which the supporting air is taken aboard the device adds a degree of restraint which destroys the accuracy of the simulation. Aside from their operational disadvantages, the body support systems associated with these devices are very uncomfortable when adapted to provide anywhere near the degree of support which is needed for their effective use.

The training device of this invention consists principally of a tank of high pressure gas, a plenum chamber member located centrally of the tank and structurally attached thereto, and a dish-shaped platform adapted to ride atop the plenum chamber on an air bearing. The plenum chamber is in fluid communication with the tank and is perforated in its top and bottom surfaces with numerous tiny holes which allow pressurized gas escaping therethrough to provide an air bearing between the chamber and the floor for floating the device, and a second air bearing between the chamber and the dish for floating the dish thereabove. The top of the plenum chamber is concave for receiving the dish which is provided with a radius of curvature approximately equal to the vertical distance between the dish and the center of gravity of a person's body when standing upright on the dish.

When the device is in operation with a trainee in a standing position on the dish, the trainee is completely disengaged from the earth in the pitch angle, the roll angle, and the yaw angle degrees of freedom. Furthermore, since the device itself, when floated over a level surface, has full freedoms in the fore and aft translational mode, and in the side-to-side translational mode, the trainee riding on the dish has five degrees of unrestrained freedom of movement.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 1 is a perspective view of the training device of this invention when in operation with a trainee standing thereon and operating a propulsive type device;

FIG. 2 is a top plan view of the device of FIG. 1 with the circular dish-shaped platform partly broken away; and FIG. 3 is a sectional view of the device as taken along the line 3—3 in FIG. 2 and looking in the direction of the arrows.

Referring more particularly to the drawings, there is shown in FIG. 1 a training device or vehicle 10 which is a preferred embodiment of this invention. The vehicle is comprised of two principal parts, a floatable base section 11 and a dish-shaped platform 12. The base section 11 includes a toroidal shaped tank 13 filled with a high pressure gas, and a plenum chamber 14 located centrally of the toroidal tank and structurally attached thereto by rigid arms 15. The arms 15 extend radially from the chamber to the toroidal tank and are provided at their inner ends with end pieces 16 which are bolted to the cylindrical-shaped side wall 17 of the plenum chamber, and at their outer ends with channel-shaped members 18 which seat the tank 13 and with cooperating clamp members 19 rigidly clamp the tank to the arms. The arms 15, of course, could be welded to the tank and plenum chamber, or rigidly attached thereto by attachment means other than those illustrated. The toroidal tank 13 is provided with an inlet check valve 20 for filling the tank with a suitable gas to a desired pressure and a connecting conduit 21 between the tank and plenum chamber establishes fluid communication therebetween.

The plenum chamber is provided with a flat bottom wall 22 and a concave upper wall 23, as best shown in FIG. 3. The flat bottom surface 24 of the wall 22 constitutes the bottom of the vehicle since the arms 15 which support the pressure tank are attached slightly higher on the side wall of the chamber whereby their bottom surfaces lie in a plane which is slightly higher than the bottom of the chamber. The wall 22 is also perforated with many tiny holes 25 which are arranged in a concentric circle symmetrical with respect to the vertical axis of the device. Pressurized gas escaping through the holes 25 thereby provides an air bearing between the plenum chamber and the flat level surface of a floor 30 when the device is placed thereon.

The concave upper wall 23 of the plenum chamber is also provided with numerous tiny holes 31 symmetrically arranged about the vertical axis of the device. Pressurized gas escaping through these holes is adapted to support the dish-shaped platform 12 atop the plenum chamber on an air bearing formed by a film of pressurized gas between the external bottom surface of the platform and the concave top surface of the plenum chamber is provided approximately equal to the vertical distance between the platform and the center of gravity of a person's body when standing upright thereon. The radius of curvature of the convex external surface of the platform substantially conforms thereto.

For controlling effectiveness of operation, a pressure regulator 41 is inserted in the conduit 21 for maintaining the pressure in the plenum chamber at a constant level until eventually the pressure in the toroidal tank drops below this value. A pressure gauge 42, shown in FIG. 2, is installed in the conduit 21 between the pressure regulator and the tank to indicate tank pressure. A pressure gauge 43 is installed in the conduit between the pressure regulator and the plenum chamber to indicate plenum chamber pressure.

To operate the training device of this invention, the pressure regulator 41 is closed and the tank filled with pressurized gas through the fill valve 20 to a suitable pressure level. The entire device is then placed on a very flat, smooth floor and the trainee steps onto the device and assumes a squatting position with his feet placed near the center of the dish-shaped platform. An assistant then opens the regulator slowly until a dependable air bearing is established between the platform and the plenum chamber and also between the plenum chamber and the floor. When this is established at a pressure in the plenum chamber which may approximate five pounds per square inch, the trainee then slowly rises to a normal standing position as shown in FIG. 1 and is ready to begin his training routine.

When the training device is in operation with a trainee in standing position on the device, as shown in FIG. 1, the trainee is completely disengaged from the earth. The floated platform provides the trainee with freedom of movement in pitch and roll over a considerable angle of movement, and in yaw over the complete angle of movement possible. Because the entire device has full freedom in the fore and aft translational mode, and in the side-to-side translational mode, a trainee using this device is allowed five degrees of freedom of movement.

The training routines which would be used by a trainee might involve learning to use muscle power in moving from one point to another by pushing off of objects to simulate pushing off of a spacecraft, or by pulling himself toward an object as by means of a tether line attached to a spacecraft. Another routine might involve exercises to control attitude in yaw by cranking a hand-held momentum wheel or, more particularly, operating propulsion devices of the type shown in FIG. 1 for learning to maintain attitude control when travelling with such devices. Such propulsion devices typically comprise a source of reaction fluid 51 which is supported on the back or hip of the individual and a reaction nozzle or gun 52 which receives reaction fluid from the tank through a flexible conduit 53. An attitude control and thrusting device similar to that carried by the trainee in FIG. 1 which could be used is disclosed in U.S. Patent No. 3,107,069. A variety of such devices, however, could be used.

The trainee learns if he is to avoid falling off the training device 10 he must remain erect by keeping the pitch and roll angles near zero at all times. He accomplishes this in a natural manner by using the same dynamic muscular balancing skills he has developed in a lifetime of walking and standing. He must also learn when applying propulsion forces that if he is to avoid falling, the propulsion forces must be directed through his own center of gravity. If he does not do this in maneuvering in the gravity-free environment of space, he would tumble when attempting to move from one place to another.

In one model of the training device of this invention which has been constructed, a platform made of magnesium, and a toroidal tank fabricated of a high-strength aluminum alloy were used. The diameter of the platform and tank was 40 inches and the radius of curvature of the platform equal 40 inches. The angle of arc subtended by the curved dish is approximately 30 degrees and the total weight of the device approximated 60 lbs. With pressures approximating 1000 lbs. per square inch, and the total weight of the device approximated 60 lbs. ber, respectively, with hole diameters in the plenum chamber walls of approximately .013 inch, continuous tests as long as 20 minutes duration were achieved. A flange, such as the flange 12a on the platform 12 of vehicle 10, was provided to limit angular movement of the platform, but its use, of course, is arbitrary.

The weight and size of the training device might be varied considerably from those cited, but as light weight as possible is desirable to minimize the tare moments of interia added to the trainee's body. In another model of the device, the plenum chamber is fabricated from light weight aluminum honeycomb with cells running vertically, and with the walls of the chamber formed by an impervious fabric such as Fiberglas cloth impregnated with an epoxy resin. The cells of the honeycomb are in fluid communication wtih each other by means of apertures drilled through the cell walls. A similar honeycomb construction was also used in fabrication of the dish-platform, and the total weight of this training device is approximately 20 lbs.

It is to be understood, of course, that although a toroidal tank is illustrated, it would be possible to use other constructions or even a plurality of tanks. In place of a pressurized tank it might also be possible to use a prime mover mounted on the plenum chamber for driving a pump to supply the pressurized gas to the chamber. The single toroidal tank, however, is preferred because the center of gravity of the high pressure gas is always kept at the geometric center of the simulator whether the tank is full or empty, or at any state inbetween. The toroidal tank also keeps the top surface of the dish clear to receive other shapes of payload. For example, a very lightweight hammock-like structure is sometimes used to support the trainee on his side and at other times on his back while utilizing the training device. These positions of the trainee allow complete angular freedoms to be achieved in pitch and roll, respectively, whereas in the mode shown in FIG. 1, complete angular freedom in yaw only is available.

It is also to be noted that a very significant advantage of the training device described which has been found by actual test of a prototype, is that the base section 11 in FIG. 1 automatically translates small amounts in any horizontal direction in response to rapid small balancing movements of the trainee. Consequently, the center of gravity of the trainee and dish is kept very close to the vertical axis of symmetry of the bottom assembly at all times. This characteristic is highly desirable because it eliminates possible bottoming of a side edge of the plenum chamber against the flat floor which could occur if the total weight supported by the air bearing surface on the floor was not applied close to the center of area of the supporting disc-shaped air bearing on the floor.

It should also be understood that the foregoing disclosure relates only to preferred embodiments of the invention and that it is intended to cover all changes and modifications of the examples in the invention herein chosen for the purposes of the disclosure and which do not constitute departure from the spirit and scope of the invention.

What is claimed and desired to be secured by Letters Patent is:

1. A training vehicle for freely supporting a person on an essentially frictionless fluid bearing which will permit movement with five degrees of freedom, said vehicle comprising:

a chamber defining member having a flat lower surface and a concave upper surface;

a toroidal tank of pressurized gas mounted on said chamber member with the center of gravity of said tank located along a vertical axis through the center of gravity of said chamber member;

conduit means for establishing fluid communication between said tank of pressurized gas and said chamber;

pressure regulator means in said conduit means for controlling the gas pressure communicated to said chamber;

a dish-shaped member with an external surface having a radius of curvature substantially conforming to the radius of curvature of the concave surface of said chamber member, said lower surface and said concave upper surface of the chamber member each being provided with a plurality of small perforations whereby pressurized gas from said tank exhausted through said perforations is adapted to create a first fluid bearing between the chamber and a floor surface over which the training device may be disposed and a second air bearing between the dish-shaped member and the concave uppper surface of the chamber member whereby a person standing on said dish member will have five degrees of unrestrained freedom of movement.

2. A training device comprising:

a source of air under pressure;

a chamber defining member constituting a plenum chamber having a flat lower surface and a concave upper surface;

conduit means for establishing fluid communication between said source of air pressure and said plenum chamber;

pressure regulator means in said conduit means for controlling the air pressure transmitted to said plenum cahmber;

a dish-shaped member with an external surface having a radius of curvature substantially conforming to the upper concave surface of the plenum chamber member and adapted to be supported therein, said lower surface and said concave upper surface of the plenum chamber member each being provided with several small perforations whereby pressurized air from said source of air pressure, when exhausted through said perforations, is adapted to create a first air bearing beneath the plenum chamber and a floor surface over which it may be disposed, and a second air bearing between the dish member and the concave surface of the chamber member whereby a person on said dish will be supported on said device uncoupled from the earth with five degrees of freedom of movement.

3. A training device comprising:

a source of air under pressure;

a chamber defining member constituting a plenum chamber in fluid communication with said source of air pressure, said chamber member having a flat bottom wall and a concave upper wall;

a dish-shaped platform member having an external surface with a radius of curvature substantially conforming to the curvature of the upper concave wall of the plenum chamber member and adapted to be supported therein, said bottom wall and said concave upper wall of the plenum chamber member each being provided with several small perforations whereby pressurized air from said source of air pressure exhausted through said perforations is adapted to create a first air bearing beneath the plenum chamber and a floor surface over which it may be disposed and a second air bearing between the platform member and the concave upper wall of the chamber member whereby a person on said dish will be supported on said device uncoupled from the earth with five degrees of freedom of movement.

4. A training vehicle comprising:

a base structure having a flat bottom surface and a concave upper surface, said surfaces having perforations therethrough;

means on said base structure for delivering pressurized air from a source of air pressure through the perforations in said bottom surface for floating said base structure on a film of air when said vehicle is placed over a level surface;

a platform in the shape of a spherical segment with the radius of curvature of said platform substantially corresponding to the radius of curvature of said concave upper surface; and means on said base structure for delivering pressurized air upwardly through the perforations in said concave upper surface for floating said platform atop said concave upper surface on a film of air whereby a person on said platform will be permitted five degrees of freedom of movement.

5. A training vehicle as described in claim 4 wherein the radius of curvature of the concave upper surface of said base structure is equal to the vertical distance between the platform and the center of gravity of a person's body when standing upright thereon.

6. A training vehicle for freely supporting a person on an essentially frictionless fluid bearing which will permit five degrees of freedom of movement, said structure comprising:

a base structure, said base structure having a flat bottom surface and a concave upper surface;

a tank of pressurized gas carried on said base structure with the center of gravity of said tank located along a vertical axis through the center of gravity of said base structure;

a dish-shaped member;

means for communicating pressurized gas from said tank at a plurality of points between the flat bottom surface of said base structure and a flat level surface when said vehicle is placed thereon to float said base structure; and means for communicating gas from said tank of pressurized gas at a plurality of points between said concave upper surface and said dish-shaped member to float said dish-shaped member thereabove whereby a person on said dish-shaped member will be supported with five degrees of freedom of movement.

7. A training vehicle for freely supporting a person on an essentially frictionless fluid bearing which will permit five degrees of freedom of movement, said vehicle comprising:

a base structure, said base structure having a flat bottom surface and a concave upper surface;

a supply of pressurized gas carried on said base structure;

a dish-shaped member;

means for communicating pressurized gas from said supply of gas pressure at a plurality of points between said flat bottomed surface of said base structure and a flat level surface when said vehicle is placed thereon to float said base structure; and means for communicating gas from said supply of gas pressure at a plurality of points between said concave upper surface and said dish-shaped member to float said dish-shaped member whereby a person on said dish-shaped member will be supported with five degrees of freedom of movement.

8. A training vehicle for freely supporting a person on an essentially frictionless fluid bearing which will permit five degrees of freedom of movement, said structure comprising:

a base structure, said base structure having a flat bottom surface and a concave upper surface;

high pressure gas containing means carried on said base structure with the center of gravity of said gas containing means located along a vertical axis through the center of gravity of said base structure;

platform means adapted to receive a trainee in unencumbered standing position thereon;

means for communicating pressurized gas from said gas containing means at a plurality of points between said flat bottom surface of said base structure and a flat level surface when said vehicle is placed thereon to float said base structure; and means for communicating gas from said gas containing means at a plurality of points between said concave upper surface and said dish-shaped platform to float said platform thereabove whereby the center of gravity of a person supported on said dish-shaped platform will be maintained close to the vertical axis through the center of gravity of said base structure at all times.

9. A training vehicle comprising:

a base structure having a flat bottom surface and a concave upper surface, said surfaces having perforations therethrough;

means on said base structure for delivering pressurized air downwardly through the perforations in said flat bottom surface for floating said base structure on a film of air when said vehicle is placed over a level surface;

a platform; and means on said base structure for delivering pressurized air upwardly through the perforations in said concave upper surface for floating said platform atop said concave upper surface on a film of air.

10. A training vehicle comprising:

a base structure having a bottom surface and an upper surface;

means on said base structure for delivering pressurized gaseous fluid to a plurality of points beneath said bottom surface for floating said base structure on a fluid film when said vehicle is disposed over a substantially flat surface;

a platform means adapted to support a trainee in standing position thereon; and means on said base structure for delivering pressurized gaseous fluid to a plurality of points between said upper surface and said platform means to float said platform means atop said base structure on a fluid film.

References Cited by the Examiner

UNITED STATES PATENTS

| | | | |
|---|---|---|---|
| 2,256,001 | 9/1941 | Titus | 272—57 |
| 2,351,293 | 6/1944 | Saunders | 272—57 |
| 3,063,714 | 11/1962 | Krauss | 272—57 |
| 3,097,718 | 7/1963 | Jay et al. | 180—7 |
| 3,135,057 | 6/1964 | Nelson et al. | 35—12 |
| 3,161,968 | 12/1964 | De Boy et al. | 35—12 |

References Cited by the Applicant

UNITED STATES PATENTS

| | | |
|---|---|---|
| 2,256,001 | 9/1941 | Titus. |
| 2,351,293 | 6/1944 | Saunders. |
| 2,764,411 | 9/1956 | Washburn. |
| 3,063,714 | 11/1962 | Krauss. |
| 3,066,951 | 12/1962 | Gray. |

EUGENE R. CAPOZIO, *Primary Examiner.*

S. M. BENDER, *Assistant Examiner.*